United States Patent
Shuy et al.

(10) Patent No.: US 8,143,793 B2
(45) Date of Patent: Mar. 27, 2012

(54) DEVICE AND METHOD FOR PERIODIC DIODE ACTUATION

(75) Inventors: Geoffrey Wen-Tai Shuy, New Territories (HK); Mei-Ling Chou, Jiali Town, Tainan County (TW)

(73) Assignee: LT Lighting (Taiwan) Corp., Hsinchu (TW)

( * ) Notice: Subject to any disclaimer, the term of this patent is extended or adjusted under 35 U.S.C. 154(b) by 648 days.

(21) Appl. No.: 12/327,280

(22) Filed: Dec. 3, 2008

(65) Prior Publication Data

US 2010/0134031 A1    Jun. 3, 2010

(51) Int. Cl.
  *H05B 37/00* (2006.01)
  *H05B 39/00* (2006.01)
  *H05B 41/14* (2006.01)

(52) U.S. Cl. .............. 315/200 R; 315/70; 315/185 R; 315/227 R; 315/246; 315/291

(58) Field of Classification Search .......... 315/51, 315/70, 185 R, 200 R–200 A, 227 R, 246–287, 315/291
See application file for complete search history.

(56) References Cited

U.S. PATENT DOCUMENTS

| | | | |
|---|---|---|---|
| 2002/0158590 A1 | 10/2002 | Saito et al. | |
| 2007/0127242 A1* | 6/2007 | Allen et al. | 362/252 |
| 2007/0252805 A1* | 11/2007 | Shuy | 345/102 |
| 2008/0265801 A1 | 10/2008 | Lee et al. | |

* cited by examiner

*Primary Examiner* — Shawki S Ismail
*Assistant Examiner* — Jany Tran
(74) *Attorney, Agent, or Firm* — Occhiuti Rohlicek & Tsao LLP

(57) ABSTRACT

An energy efficient illumination device is provided in which energy consumption is reduced by using a pulse generating circuit which provides power to LEDs in short pulses, and in which the circuit has a lifespan which is comparable to that of an LED. The illumination device includes a pulse generator circuit employing only passive circuit components and which is used to generate a desired pulsed and positively DC biased output waveform. The pulse generator circuit receives alternating current power as an input, alters the power waveform, and supplies the power to LEDs for a very short time (0.2-15 ms) during each cycle of a 50-60 Hz input signal. This paradigm of pulsed light emission provides ambient lighting that is perceived by humans to be steady and continuous, and which also provides substantial energy savings since power is used in only a fraction of the power cycle.

20 Claims, 6 Drawing Sheets

DEVICE AND METHOD FOR PERIODIC DIODE ACTUATION

FIELD OF THE INVENTION

The invention relates to periodic switching of diodes between on and off states using a voltage wave-form to drive the diodes and without using a physical switch, and more specifically relates to periodic switching of an LED lamp between on and off states at a frequency of 20 Hz to 300 Hz to provide cost effective and energy efficient lighting.

BACKGROUND

A light-emitting diode (LED) is a semiconductor diode that emits light when driven with a forward biased current. An LED can be used as a regular light source, and has many advantages when compared with conventional incandescent light bulbs or fluorescent lamps. Efficient methods of providing lighting using LEDs are known. For example, an efficient LED lighting method is disclosed in U.S. Pat. Pub US2007/0252805(A1) by the same inventor, which is incorporated herein by reference. As disclosed in US2007/0252805(A1), efficient lighting can be achieved by utilizing the properties that (1) an LED can be turned on or turned off in less than a fraction of a millisecond, and (2) the human eye retains images (brightness) for more than 20 milliseconds after cessation of illumination. A method is disclosed in which a physical switch is used to periodically switch a direct current (DC) powered LED between an on state and an off state at frequencies sufficient to accommodate human eye vision retention properties.

US2007/0252805(A1) includes a description of an approach to driving an LED (or an array of LED) in which a relatively short, intense driving interval, for example, 3-6 ms in duration, is alternated with a relatively long substantially non-driven interval, for example, 30-50 ms in duration. A model for human perception of intensity of the light produced by an LED driven in such a manner accounts for the rapid onset of substantially full perceived intensity ("saturation") during the short driving interval coupled with a relatively slow decay of perceived intensity during the long non-driven interval. Under this model, a perception of intense illumination is achieved with a relatively low duty cycle during which the LED is actually driven.

Various types of circuits may be used to generate a desired driving voltage (or current) to drive an LED (or LED array) according to the general approach described in US2007/0252805(A1). For example, electrical switching elements (e.g., transistors), or mechanical elements (e.g., relays) may be used. In certain applications, use of such active switching elements may be appropriate given commercial or other considerations.

As outlined above, for some applications, there is a need for the circuitry for driving the LED to have a lifetime of the same order as the LED themselves. In certain examples, particularly in those circuits using relatively high driving currents, the inventors have observed relatively short lifetime for active switching elements of the circuits as compared to the long lifetime for the LED themselves.

Although the lighting method disclosed in US2007/0252805(A1) provides efficiency advantages, use of a physical switch to periodically switch an LED between on state and an off state is expensive due to the required high frequency of switching, which results in a relatively short physical switch component life-span as compared to the life span of an LED, as well as relatively high replacement costs associated with replacing failed physical switch components.

Articles describing advantages of using LED-base illumination over existing conventional light sources can be found in many places including the internet, journals, and news papers. In view of the advantages of using LED as a light source, there are substantial economic benefits to be gained if the energy required to power an LED can be further reduced from the conventional DC-operated LED lighting as described in US2007/0252805(A1).

A method of periodically alternating one or more diode(s) (including LED) between on and off states is needed. Such a method should take advantage of the physical properties of diode(s) and of human visual perception. In addition, such a method should provide a cost effective device having a life time comparable to that of the diode(s).

SUMMARY

A device and method are directed to providing periodic alternation of one or more LEDs between an on state and an off state without employing a physical switch to do so. The device includes circuitry having in-circuit diode(s), the circuitry generating an AC wave-form to periodically alternate the LEDs between an on and off state in a desired manner. The circuitry is designed to generate an AC voltage waveform that includes a DC bias set to be just below the turn-on threshold of the LEDs. The AC voltage waveform also includes a periodic "ripple" or "pulse" above the bias. The circuitry thus forces the in-circuit diode(s) to turn current on or off, or up or down. Thus, the power consumed is also being turned on or off, or up or down. The frequency of the periodic ripple is in the acoustic frequency range. The amplitude and the waveform-factor of the periodic ripple are designed such that the current that passes through the LED(s) is controlled to have a desired maximum current, correct current rising/falling times, and the desired high and low current duration times. Thus, the LED(s) can be periodically alternated between an on state and an off state in the desired manner. The device is designed to use in-circuit diode(s) to provide a switching function under the provided AC wave-form, thus the life time of the device naturally equals the diode life time.

An advantage of one or more approaches described in this specification is to provide an energy efficient illumination device. In some examples, energy consumption of an illumination device is reduced by using a circuit which provides power to light sources in short pulses. In some examples, the circuit has a lifespan which is comparable to the lifespan of the light source. In other examples, the circuit may not necessarily yield such a lifespan, but may have other advantages, such as those based on commercial considerations.

More specifically, an illumination device is provided in which a circuit employing passive circuit components is used to generate a desired output waveform without requiring use of active switching circuit components. Herein, "active switching components" correspond to the above-described physical switches, and are defined as those components which provide active switching such as transistors (electrical switches) or relays (mechanical switches). Also herein, "passive circuit components" are defined as those components which are non-transistors or non-physical switches, and the term "passive circuit" refers to a circuit employing only passive circuit components. In order to achieve the desired output waveform, in some examples, advantage is taken of the non-linear characteristics of some passive circuit elements such as diodes, capacitors, transformers, and inductors. In some examples, the illumination device employs one or more LEDs as a light source, taking advantage of the LED characteristics of very fast ability to change between on and off states, and long service life.

In one approach, a passive circuit is provided which includes only passive circuit components and is adapted to receive alternating current (AC) power and alter the received alternating current power to generate an output waveform comprising pulses. In some embodiments, the pulses have a duration in the range of 0.2 to 3.5 milliseconds (ms) at a frequency substantially synchronized with the frequency of the AC power. In some embodiments, the pulses have a duration in the range of 0.2 to 15.0 ms at a frequency substantially synchronized with the frequency of the AC power. The circuit is further adapted to provide the output wave with a positive DC bias, and output the altered waveform to an output connector configured to receive a solid state light emitting device, such as an LED.

In another approach, the illumination device comprises a light fixture for supporting one or more light emitting devices (light sources). The passive circuit described above is disposed within fixture housing and is adapted to be connected to an external source of alternating current power. Specifically, the fixture may be hard-wired to the external power source, or alternatively may include a connector for selectively coupling to the external power source. In addition, the passive circuit is coupled to a light emitting device receptacle mounted on the fixture housing. The receptacle is configured to support light emitting devices on the housing and to provide an electrical connection to the output of the passive circuit. When the passive circuit receives power from the AC power supply, the circuit is configured to generate the desired output waveform. When a light emitting device such as an LED is disposed within the receptacle, the LED is driven to provide illumination during each respective pulse, and is otherwise in an off (non-illuminated) state.

In yet another approach, an apparatus for providing illumination is presented which uses as an input an alternating current power supply signal, such as that provided by a utility, modifies the alternating input waveform provided by the utility, and outputs a rectified, DC biased signal having short-duration pulses superimposed thereon. The apparatus is configured to connect to a solid state light emitting device, such as an LED. The light emitting device may be hard wired to the apparatus, or alternatively, the apparatus may include a connector for selectively permitting connection to the light emitting device. The apparatus includes a passive circuit which consists of only non-switching circuit components to alter the alternating current power supply signal, whereby the desired output waveform is generated using a circuit having a service life comparable to that of the light emitting device.

A method of providing energy efficient illumination is disclosed. The method includes providing a light emitting source with a driving power supply having a waveform which includes pulses In some embodiments, the pulses have a duration in the range of 0.2 to 3.5 milliseconds (ms) at a frequency substantially synchronized with the frequency of the AC power. In some embodiments, the pulses have a duration in the range of 0.2 to 15.0 ms at a frequency substantially synchronized with the frequency of the AC power. By employing this method of illumination, a periodically pulsed light is emitted, steady and continuous illumination is visually perceived, and the energy consumption used to provide the illumination is substantively reduced relative to conventional illumination techniques. The method further includes providing the waveform with a positive DC bias to enhance the on-off changing speed of the light emitting source.

In particular, the device and method provide ambient lighting in pulsed mode in which an LED is supplied with power for a very short time (approximately 3 ms or less) during each cycle of a 50-60 Hz input signal. This paradigm provides ambient lighting that is perceived by humans to be steady and continuous, and which also provides substantial energy savings since power is used in only a fraction of the power cycle.

Modes for carrying out the present approaches are explained below by reference to embodiments of the present approach shown in the attached drawings. The above mentioned object, other objects, characteristics and advantages will become apparent from the detailed description of the embodiments presented below in conjunction with the attached drawings.

DETAILED DESCRIPTION

Selective embodiments of the present approach will now be described with reference to the drawings. It should be understood that only structures considered necessary for clarifying the present approach are described herein. Other conventional structures and those of ancillary and auxiliary components of the device and method are assumed to be known and understood by those skilled in the art.

In some examples, circuitry for driving the LED is constituted by passive components (e.g., resistors, capacitors, diodes), such that the circuitry is formed without using any active switching components (e.g., transistors, relays). For example, circuitry consisting of passive components is used to transform an alternating current power source (e.g., a utility power source at 50-60 Hz) to a pulsed and biased power signal that is then passed to the LED. More specifically, the response function of the passive components (e.g., diodes) is used to force the load to alternate between an on state and an off state through a supplied voltage wave form. The wave form includes an AC voltage waveform including both a DC bias selected to be just below the turn-on-threshold of the LED(s), and a periodic "ripple" above the bias. In some examples, such passive circuitry yields a lifetime that is in the same order of duration as that of the LED. In other examples, such circuitry may not necessarily yield such comparable lifetime, but have other advantages, such as those based on commercial considerations.

Figure 1:
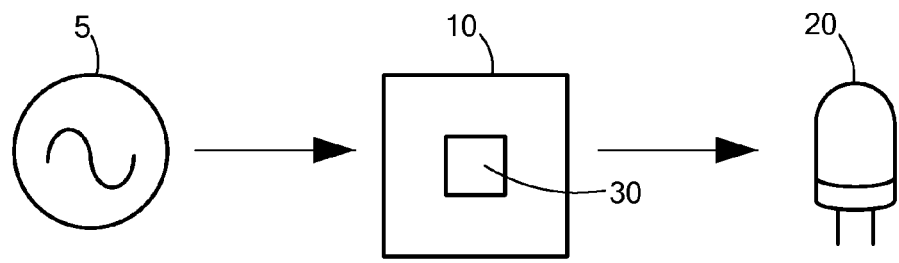
FIG. 1 is a schematic illustration of an illumination device.

An example of a lighting apparatus 10 for providing illumination is shown schematically in FIG. 1. Generally, the apparatus includes a circuit that receives power having an alternating current waveform as an input, alters the waveform, and outputs the altered waveform to a solid state light emitting device. The lighting apparatus 10 uses as an input an alternating current power signal from a power supply 5, such as that provided by a utility, and modifies the input alternating waveform. The apparatus 10 includes a pulse generator circuit 30, which outputs a rectified, DC biased signal having short-duration pulses superimposed thereon. The apparatus 10 is configured to connect to a solid state light emitting device 20, such as an LED, whereby the LED is driven to produce illumination for relatively short intervals at a frequency that is related to (e.g., the same as, or one of the harmonic frequencies of) the frequency of the input power signal. In some embodiments the LED is driven to produce illumination for an interval of about 3-6 ms to achieve illumination perceived as constant while minimizing power consumption. In other embodiments, the LED is driven to produce illumination for an interval of about 8-11 ms to achieve illumination perceived as constant and as having brightness equivalent to that of a similar DC-driven apparatus.

Figure 2:
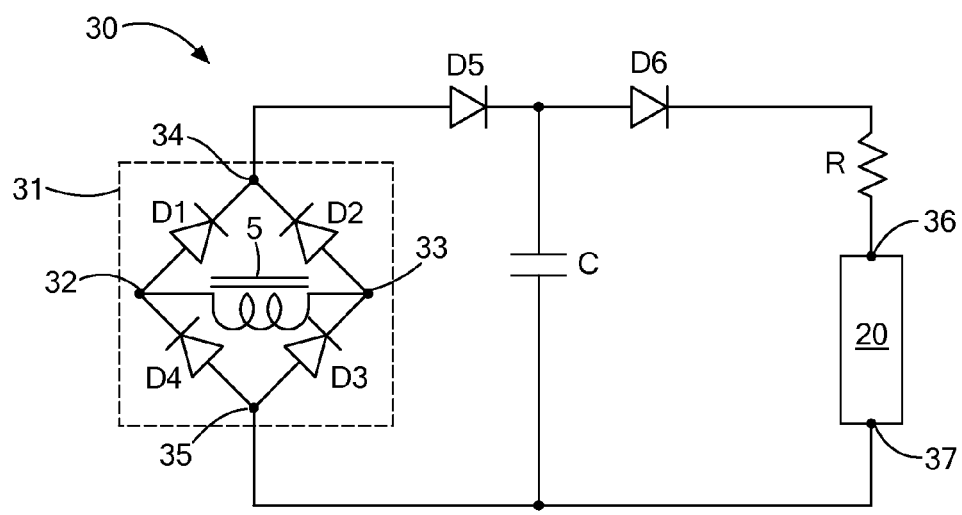
FIG. 2 is a diagram of a pulse generator circuit.

The pulse generator circuit 30 is a passive circuit that uses only passive (non-switching) circuit components, and takes advantage of the non-linear character of some passive circuit elements such as diodes. Referring to FIG. 2, an embodiment of the pulse generator circuit 30 is illustrated. The pulse generator circuit 30 is configured to produce an output waveform having a rectified, DC biased signal, the signal having short-duration pulses superimposed thereon. The pulse generator circuit 30 includes a rectifier 31, which includes four diodes D1, D2, D3, D4, generally arranged in a conventional bridge arrangement in which alternating current is applied to terminals 32-33 of the bridge, and a rectified signal is generated on terminals 34-35.

The pair of circuit input terminals 32, 33 is connected across a first side of the bridge circuit, permitting connection to an input power source. Such connection may be hardwired, or may be configured to permit selective interconnection between the circuit input terminals 32, 33 and the input power source. An alternating current power source 5 is connected to the pair of circuit input terminals 32, 33 to provide an alternating input into the circuit 30. In the illustrated embodiment, the input power source 5 includes utility power having a frequency of 50-60 Hz. The alternating current power source 5 is configured to modify the utility power, for example by means of a transformer circuit (not shown), to provide the desired input voltage. However, the approach is not limited to one in which the voltage of the utility power is transformed within the input power source 5, but can also include providing utility power directly to the circuit 30, and providing a transformer within the circuit to modify the input voltage to a desired value. In addition, the approach is not limited to using utility power as a power source as long as the current is alternating in polarity, and the frequency, for example, is provided in the range of 20 to 300 Hz.

The pair of bridge output terminals 34, 35 is connected across a second side of the bridge circuit, permitting connection to an output load. In this embodiment, the output load is a solid state light emitting device 20. Such a solid state light emitting device is embodied, for example, by at least one diode or LED.

In the bridge portion of the circuit, the first diode D1 and the third diode D3, arranged in series, permit conduction in forward conduction mode (for example, during portions of the input power cycle in which input current has positive polarity), and the second diode D2 and the fourth diode D4, arranged in series, permit conduction in reverse conduction mode (for example, during portions of the input power cycle in which input current has negative polarity). That is, the rectifier 31 produces a full-wave rectified voltage signal, for example, having positive sinusoidal pulses. It should be noted that the resulting voltage waveform may be very different from positive sinusoidal pulses when it is further modified by the non-linearity of the circuit with load.

The pulse generator circuit 30 includes further components that alter the rectified output of the rectifier 31 to produce a desired pulse signal for driving the LED. A capacitor C is arranged such that, in general, the capacitor charges via a diode D5 with current from the rectifier, and discharges via a diode D6 to the LED load.

In some embodiments, a resistor R is provided between the diode D6 and the LED load. The resistor R provides a damping factor that permits the LED to deliver stable (e.g. non-flickering) lighting. The resistor R can also be used to determine the amount of the current passing through the LED load by measuring voltage across the known resistor R. An oscilloscope can also be used to measure the voltage across the entire load, including or excluding the resistor, at the same time as the voltage across the resistor is measured, to determine the amount of the current passing through the load as function of time. From the measurements of current and voltage as function of time, the power consumed by the load per cycle can be calculated.

Figure 4:
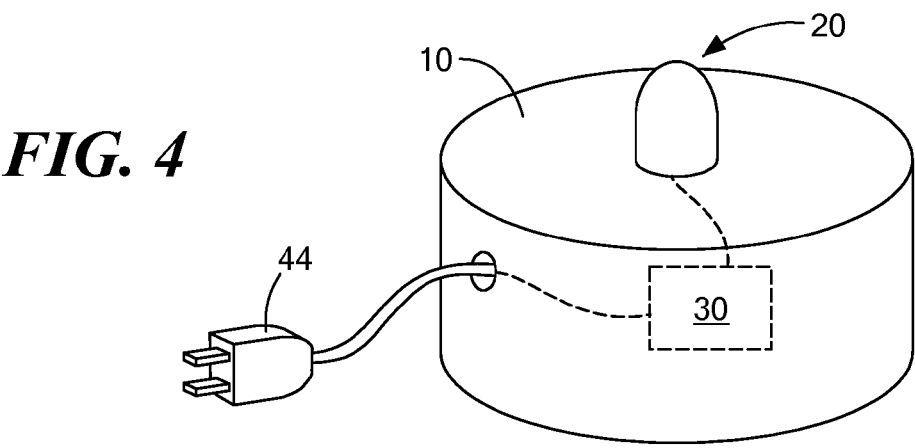
FIG. 4 illustrates an embodiment of an illumination apparatus.
Figure 5:
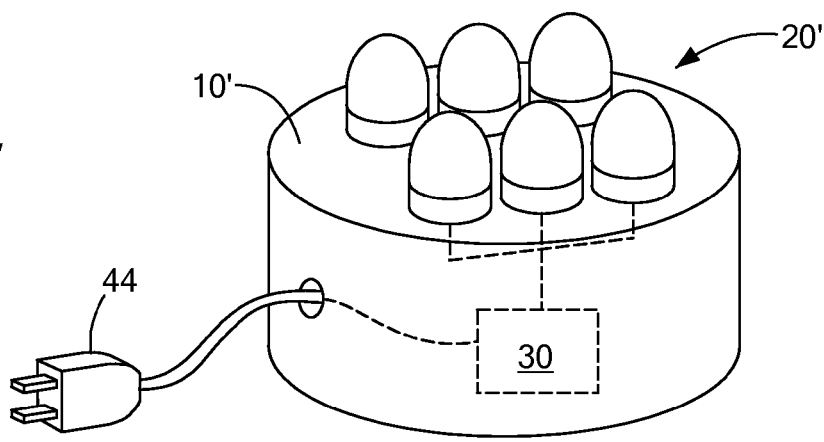
FIG. 5 illustrates a first alternative embodiment of an illumination apparatus.
Figure 6:
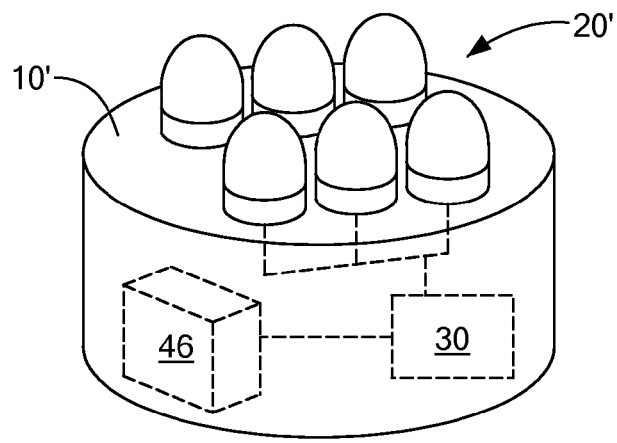
FIG. 6 illustrates a second alternative embodiment of an illumination apparatus.

In some embodiments, the apparatus 10 includes the pulse generator circuit 30 and further incorporates the light emitting device 20 (FIGS. 4-6). In this embodiment, the solid state light emitting device 20 may be hard wired to the circuit output terminals 36, 37 of the pulse generator circuit 30.

Figure 7:
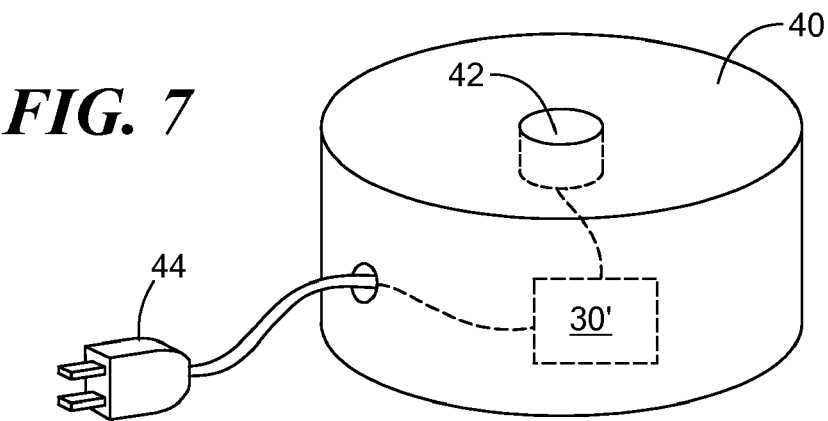
FIG. 7 illustrates a third alternative embodiment of an illumination apparatus.
Figure 8:
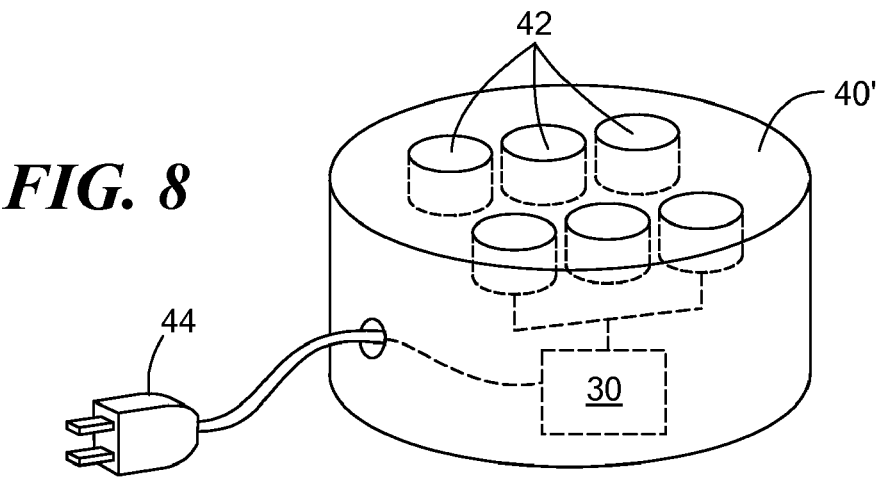
FIG. 8 illustrates a fourth alternative embodiment of an illumination apparatus.
Figure 9:
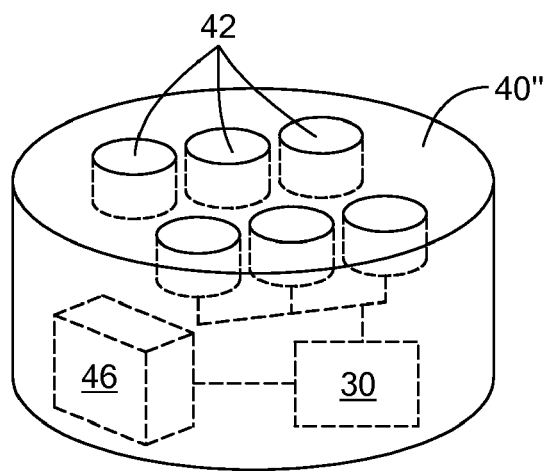
FIG. 9 illustrates a fifth alternative embodiment of an illumination apparatus.

In some embodiments, the apparatus 10 includes the pulse generator circuit 30, but does not include the light emitting device 20 as part of the device (FIGS. 7-9). Instead, the apparatus 10 serves as a light fixture, and permits selective attachment with the light emitting device 20. In this embodiment, apparatus 10 is formed to include at least one light emitting device-receiving socket 42 formed within a fixture housing 40. In this embodiment, the socket 42 is supported by the housing, and is electrically connected to the pulse generator circuit 30. The socket 42 is configured to receive and hold the light emitting device 20 therein, and to permit the lighting device to be connected to the pulse generator circuit 30 and receive the output thereof.

Figure 3A:
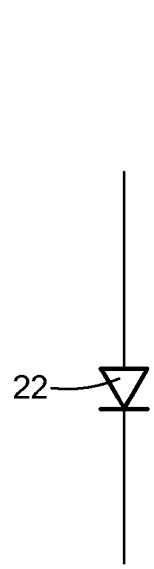
FIG. 3a shows a single LED.
Figure 3B:
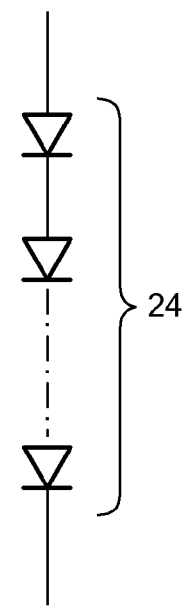
FIG. 3b shows a plurality of LED connected in series.
Figure 3C:
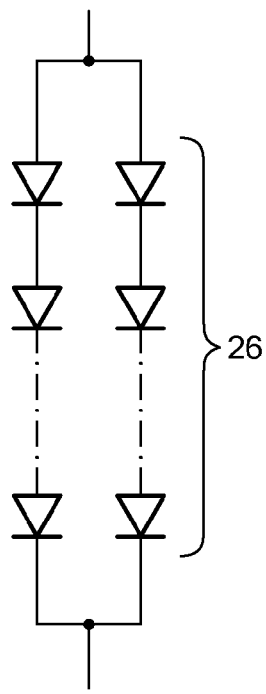
FIG. 3c shows a plurality of LED connected in parallel.
Figure 3D:
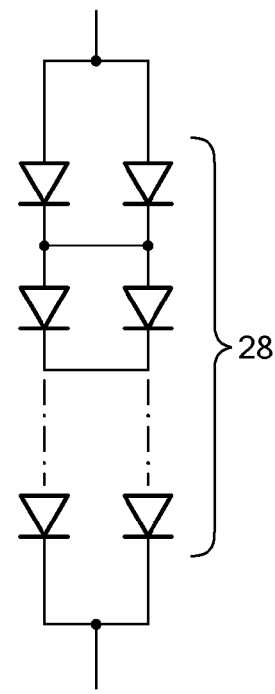
FIG. 3d shows a plurality of LED connected both in series and in parallel.

In some embodiments, the single light emitting device 20 may be replaced with an arrangement of multiple light emitting devices. The plural light emitting devices may be connected to the pulse generator circuit 30 using many different configurations. Examples of possible configurations are illustrated in FIG. 3, but it is understood that the present approach is not limited to the shown configurations. FIG. 3a illustrates a single LED, FIG. 3b illustrates plural LED connected in series 24, FIG. 3c illustrates plural LED connected in parallel 26, and FIG. 3d illustrates plural LED connected both in series and parallel 28.

In embodiments in which the apparatus 10 uses as an input an alternating current power supply 5, such as that provided by a utility, the apparatus 10 optionally includes a connection device 44, for example a socket (not shown) or plug (FIGS. 4, 7) to connect to an external source of power. However, it is within the scope of the approach to provide an apparatus 10 which includes an internal alternating current power supply 46 (FIGS. 6, 9).

The results of operation of an apparatus 10 including a pulse generator circuit 30 (FIG. 2) will now be described. In the apparatus 10, the pulse generator circuit was used drive an array 24 of ten LEDs connected in series (FIG. 3b). The LEDs used were 0.2 W white color LEDs. However, it is understood that the approach is not limited to LED having this rating or color, and that other solid state light emitting devices may be substituted for the LED. In addition, the circuit included the resistor R having a resistance of approximately 13.2Ω, and the capacitor C having a capacitance of approximately 0.1 μF. The diodes (D1 to D6) are commercially available diodes. In the example, diodes having number 1N4148 were used. However, it is understood that the approach is not limited to this particular diode. In addition, it is contemplated that diodes D1-D6 may be replaced by LEDs, for example of the same type used in the LED array 24. By doing so, the brightness emitted by the apparatus 10 will be correspondingly increased.

In this example, a transformer was used to reduce the utility-provided voltage to a lower voltage. More particularly, a transformer was used to transform 110 (or 220) VAC to 24 VAC.

Figure 10:
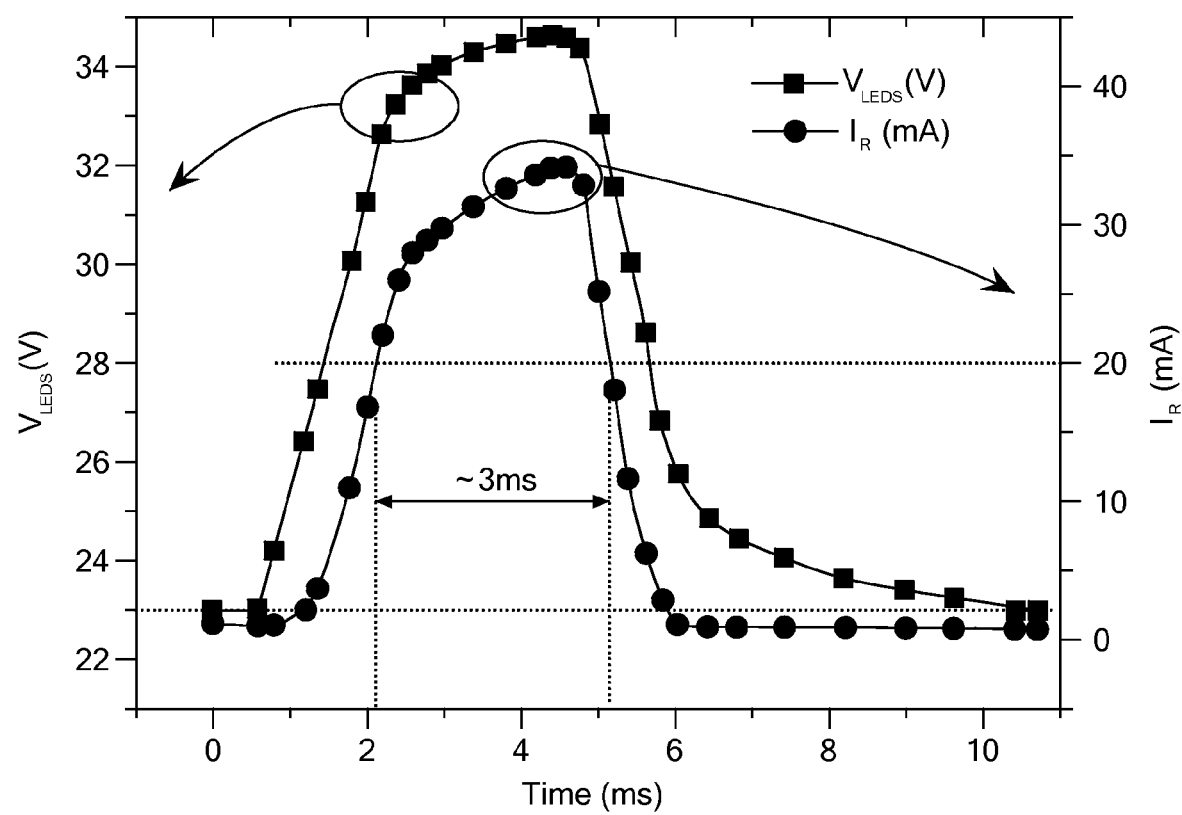
FIG. 10 shows the output voltage (left ordinate) Vo(t) and output current Io(t) as measured across the circuit output terminals 36, 37 as a function of time for a single pulse input.

FIG. 10 shows the output voltage (left ordinate) Vo and output current Io (right ordinate) as measured across the circuit output terminals 36, 37 as a function of time for a single pulse input. It can be noted that the rising time of the voltage curve Vo(t) is different from its falling time, and the same observation can be made for the current curve Io(t). Furthermore, the rising time and the falling time of the voltage curve Vo(t) is different than the respective corresponding portions of the current curve Io(t). This information indicates a phase delay between the voltage curve Vo(t) and the current curve Io(t).

Note that the threshold voltage $V_{(threshold)}$ of an LED depends on the kind of LED used. In a device which includes an array of LEDs, the threshold voltage $V_{(threshold)}$ depends on the kind of LED used as well as the arrangement of LEDs. The individual LED used to generate the data in FIG. 10, have a threshold of just above 2.3 volts. Thus an array 24 of ten such LEDs in a serial arrangement (FIG. 3b) has a threshold voltage $V_{(threshold)}$ of just above 23 volts. The LED array 24 is not substantially driven during the portion of the waveform with driving voltage below $V_{(threshold)}$. Therefore, while the capacitor voltage $V_{(cap)}$ across the capacitor C is below the threshold, the LED array 24 is not driven, and the capacitor C does not substantially discharge through diode D6. Furthermore, when the output of the rectifier 31 is below the capacitor voltage $V_{(cap)}$, the capacitor C does not charge through diode D5. By selecting the peak voltage of the output $V_{(rectifier)}$ of the rectifier 31 such that the rectifier voltage $V_{(rectifier)}$ substantially exceeds the threshold voltage $V_{(threshold)}$ of the LED array 24 for a relatively short period, the capacitor C can maintain a little bit below the threshold voltage of the LED array 24 for most of the cycle, while maintaining a bias voltage on the LED array 24. The driving circuit 30 provides the additional pulse superimposed on the bias voltage, which has a short-duration voltage that exceeds the threshold voltage $V_{(threshold)}$, whereby the LED array 24 is briefly driven. Therefore, By selecting the peak voltage of the output $V_{(rectifier)}$ of the rectifier 31 such that the rectifier voltage $V_{(rectifier)}$ exceeds the threshold voltage $V_{(threshold)}$ of the LED array 24 for a relatively short period, the capacitor C can be maintained just below the threshold voltage $V_{(threshold)}$ and the LED array 24 can be lit up for a short period of time. As a result, the LED array 24 is substantially lit up during the relatively short period that corresponds to the period that that the rectifier output voltage substantially exceeds LED threshold voltage $V_{(threshold)}$.

The electric field distribution in an LED dictates that the current flow starts from the same anode pad and moves toward different photon generating areas, and then flows to the same cathode pad in the LED along different paths. There may be different parasitic resistances and capacitances associate with different current paths. This phenomenon may cause a short period of time differences required between different areas of LED to reach their illumination threshold; that is, to generate photons and then to reach a state of generating photons with stable flux (stable illumination). When the LED has reached a state of stable illumination at every area, the current also reaches a "saturation" state. When the duration time of stable illumination exceeds 0.2 ms, the human eye perceives a state of constant brightness without being tiring to the eye. By using a AC power source altered to provide a pulsed light source, substantial energy can be saved as compared to a similar LED arrangement that is driven using a DC power source, when the duration of time corresponding to the rectifier output voltage substantially exceeding the LED threshold voltage $V_{(threshold)}$ is kept below 3.5 ms. Referring to the current curve Io(t), in order to obtain the desired short pulse duration to reach "saturation" state and achieve substantial energy saving, a positive DC bias of approximately 23V is used in FIG. 10. The voltage of the DC bias is not limited to this value, and is generally kept below the thresholds of the LED used. Providing the positive DC bias in the output of the pulse generator circuit 30 compensates for the parasitic effects of the LED, and can reduce the time required for the LED to illuminate.

Figure 11:
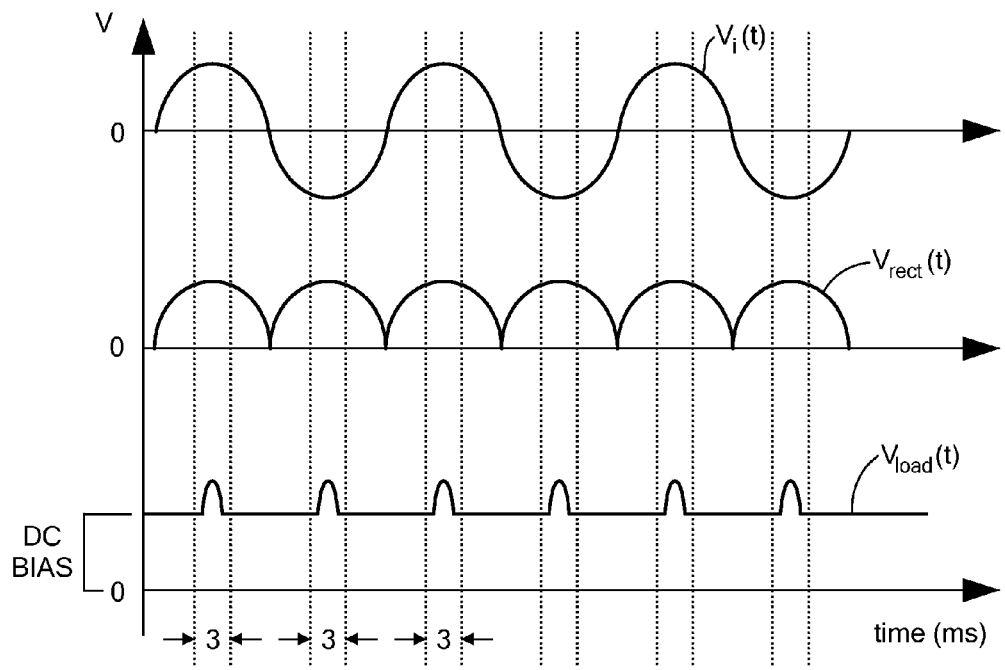
FIG. 11 is a graph comparing the input alternating current power signal $V_i(t)$, the output voltage $V_{(rectifier)}(t)$ across the bridge rectifier, the output voltage $V_{(cap)}(t)$ across the capacitor, and the $V_{(load)}(t)$ across the LED load, plotted as a function of time for several input cycles, for an input signal frequency of approximately 60 Hz.

FIG. 11 shows the input alternating current power signal $V_i(t)$, the output voltage $V_{(rectifier)}(t)$ across the bridge rectifier, the output voltage $V_{(cap)}(t)$ across the capacitor, and the $V_{(load)}(t)$ across the LED load (array 24), plotted as a function of time for several input cycles. It can be seen that the apparatus 10 produces a pulsed output waveform having a DC bias. In this case, the DC bias is approximately 23 V, and the pulse duration is approximately 3 ms. It can also be seen that the pulse frequency is synchronized to the frequency of the input signal. In this example, the input signal used was approximately 60 Hz, and the pulse frequency is doubled to 120 Hz.

Figure 12:
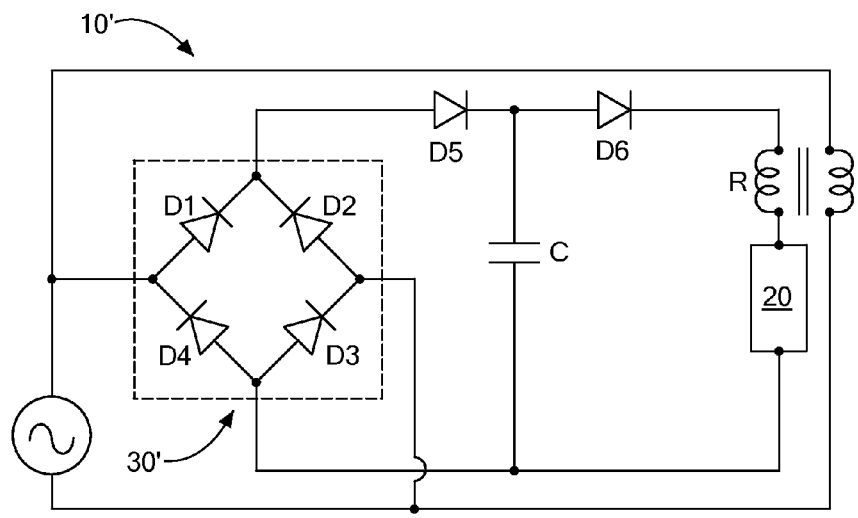
FIG. 12 is an alternative embodiment of a pulse generator circuit in which the pulse generating portion of the circuit is separate from a biasing circuit, the two circuits connected to form the desired waveform.

The pulse generator circuit 30 described above is configured to generate an output waveform having both pulses of very short duration which occur at a frequency corresponding to that of an input frequency, and a positive DC bias. However, it is well within the scope of this approach to employ multiple, interconnected circuits to obtain the desired output waveform. For example, FIG. 12 is a schematic illustration of an alternative device 10' having a first, pulse generating circuit 30' separate from a second circuit which provides a positive DC bias. In this alternative device, the two circuits are connected to form the desired waveform.

The approaches described above can be used to provide energy efficient illumination. The method includes providing a light emitting source with a driving power supply having a waveform which includes pulses having a duration in the range of 0.2 to 15.0 milliseconds (ms) at a frequency substantially synchronized with the frequency of the AC power. By employing this method of illumination, a periodically pulsed light is emitted, steady and continuous illumination is visually perceived, and the energy consumption used to provide the illumination is substantively reduced relative to conventional illumination techniques.

In particular, the method includes generating a desired pulsed waveform using a passive circuit powered by an alternating current power supply. Such a passive circuit is embodied by the pulse generator circuit 30 described above, but is not limited thereto. In the inventive method, pulse generator circuit 30 is configured to receive alternating current power, and is connected to a solid state light emitting device 20. As described above, the pulse generator circuit 30 alters the alternating current power to generate an output waveform comprising pulses having a duration in the range of 0.2 to 15.0 ms at a frequency substantially synchronized with the frequency of the alternating current power, and having a positive DC bias. The pulse generator circuit 30 outputs the altered waveform to the light emitting device 20, whereby a periodically pulsed light is emitted, and steady and continuous illumination is visually perceived.

While a working example of the present approach has been described above, the present approach is not limited to the working example described above, and various design alterations may be carried out without departing from the present approach as set forth in the claims.

What is claimed is:

1. An illumination apparatus comprising:
a solid state light emitting device; and
a circuit coupled to the solid state light emitting device, the circuit configured to accept alternating current power,
wherein the circuit consists of non-switching circuit components configured to alter the alternating current power to generate an output waveform having pulses having a duration in the range of 0.2 to 15 ms at a frequency substantially synchronized with the frequency of the alternating current power and the circuit further consists of a rectifier consisting of passive components, a capacitor, a resistor, a first diode, a second diode, a pair of input terminals configured to allow connection to alternating current power, and a pair of output terminals configured to allow connection to the solid state light emitting device, and wherein
the capacitor is arranged in parallel with the output terminals,
the resistor is arranged in series with the output terminals and disposed on a load side of the capacitor, and
the first and second diodes are arranged in series with the output terminals such that the first diode is disposed on an input side of the capacitor, and the second diode is disposed on the load side of the capacitor.

2. The illumination apparatus of claim 1 wherein the circuit is configured to provide the output waveform with a positive DC bias.

3. The illumination apparatus of claim 1 comprising further circuitry which further alters the output waveform to have a positive DC bias.

4. The illumination apparatus of claim 1 wherein the input power supply provides an alternating current having a frequency in the range of 20 Hz to 300 Hz.

5. The illumination apparatus of claim 1 wherein the solid state light emitting device comprises at least one LED.

6. The illumination apparatus of claim 1, wherein the rectifier comprises a third diode, a fourth diode, a fifth diode, and a sixth diode, and wherein
the third, fourth, fifth and sixth diodes are connected in a single bridge circuit with one of the third, fourth, fifth and sixth diodes disposed in a different arm of the bridge,
the pair of input terminals are connected across a first side of the bridge circuit, and the pair of output terminals are connected across a second side of the bridge circuit, such that the third and fifth diodes, arranged in series, permit conduction in forward conduction mode, and the fourth and sixth diodes, arranged in series, permit conduction in reverse conduction mode.

7. A light fixture, the light fixture comprising:
a receptacle configured to support a light source, the receptacle comprising:
a first connector configured to receive alternating current power; and
a second connector configured to receive a solid state light emitting device,
and
a circuit disposed within the receptacle, the circuit coupled to the first connector and configured to receive alternating current power from the first connector, the circuit further coupled to the second connector and configured to provide an output waveform to the second connector,
wherein the circuit consists of non-switching circuit components configured to alter the alternating current power to generate the output waveform comprising pulses having a duration in the range of 0.2 to 15 ms at a frequency substantially synchronized with the frequency of the alternating current power, and the circuit further consists of a rectifier consisting of passive components, a first diode, a second diode, a capacitor, and a resistor, and wherein
the capacitor is arranged in parallel with the second connector,
the resistor is arranged in series with the second connector and is disposed on a load side of the capacitor,
the first and second diode are arranged in series with the second connector such that the first diode is disposed on an input side of the capacitor, and the second diode is disposed on the load side of the capacitor.

8. The light fixture of claim 7 wherein the second connector is configured to receive at least one LED.

9. The light fixture of claim 7 wherein the output waveform further comprises a DC bias.

10. The illumination apparatus of claim 7 comprising further circuitry which further alters the output waveform to have a positive DC bias.

11. The light fixture of claim 7, wherein the rectifier comprises a third diode, a fourth diode, a fifth diode, a sixth diode, a pair of input terminals connected to the first connector, and a pair of output terminals connected to the second connector, wherein
the third, fourth, fifth, and sixth diodes are: connected in a single bridge circuit with one of the third, fourth, fifth, and sixth diodes disposed in a different arm of the bridge, and
the pair of input terminals is connected across a first side of the bridge circuit, and the pair of output terminals is connected across a second side of the bridge circuit, such that the third and fifth diodes, arranged in series, permit conduction in forward conduction mode, and the fourth and sixth diodes, arranged in series, permit conduction in reverse conduction mode.

12. A method of providing illumination, the method comprising
providing a circuit comprising:
an input connector configured to receive alternating current power; and
an output connector configured to receive a solid state light emitting device,
wherein the circuit consists of non-switching circuit components and the circuit further consists of a first diode, a second diode, a capacitor, a resistor, and a rectifier consisting of passive components, and wherein
the capacitor is arranged in parallel with the second connector,
the resistor is arranged in series with the second connector and is disposed on a load side of the capacitor,
the first and second diode are arranged in series with the second connector such that the first diode is disposed on an input side of the capacitor, and the second diode is disposed on the load side of the capacitor, and
when the circuit is coupled to the input connector and receives alternating current power through the input connector, the circuit alters the alternating current power to generate an output waveform comprising pulses having a duration in the range of 0.2 to 15 ms at a frequency substantially synchronized with the frequency of the alternating current power, and outputs the altered waveform to the output connector.

13. The method of claim 12 wherein the output waveform further comprises a positive DC bias.

14. The method of claim 12 further comprising:
providing a solid state light emitting device coupled to the output connector; and
generating light using the altered waveform output from the circuit,
whereby a periodically pulsed light is emitted, and steady and continuous illumination is visually perceived.

15. The method of claim 14, wherein the solid state light emitting device comprises at least one light emitting diode.

16. The method of claim 12, wherein the rectifier comprises a third diode, a fourth diode, a fifth diode, and a sixth diode, wherein the third, fourth, fifth and sixth diodes are connected in a single bridge circuit with one of the third, fourth, fifth, and sixth diodes disposed in a different arm of the bridge,
the first connector comprises a pair of input terminals connected across a first side of the bridge circuit, and the second connector comprises a pair of output terminals connected across a second side of the bridge circuit, such that the third and fifth diodes, arranged in series, permit conduction in forward conduction mode, and the fourth and sixth diodes, arranged in series, permit conduction in reverse conduction mode.

17. A circuit for processing alternating current power, wherein
the circuit consists of non-switching circuit components including an output connector configured to receive a solid state light emitting device, and the circuit further consists of a first diode, a second diode, a capacitor, a resistor, a pair of input terminals configured to allow connection to alternating current power, a pair of output terminals connected to the output connector, and a rectifier consisting of passive components, wherein
the capacitor is arranged in parallel with the output terminals,
the resistor is arranged in series with the output terminals and is disposed on a load side of the capacitor, and
the first and second diode are arranged in series with the output terminals such that the first diode is disposed on an input side of the capacitor, and the second diode is disposed on the load side of the capacitor, and
the circuit is adapted to:
receive alternating current power;
alter the received alternating current power to generate an output waveform comprising pulses having a duration in the range of 0.2 to 15 ms at a frequency substantially synchronized with the frequency of the alternating current power, and
output the altered waveform to the output connector.

18. The circuit of claim 17 wherein the output waveform further comprises a positive DC bias.

19. The circuit of claim 17, wherein the output connector is configured to support and provide an electrical connection with an LED.

20. The circuit of claim 17, wherein the rectifier comprises a third, fourth, fifth, and sixth diode connected in a single bridge circuit with one of the third, fourth, fifth, and sixth diodes disposed in a different arm of the bridge,
the pair of input terminals are connected across a first side of the bridge circuit, and the pair of output terminals are connected across a second side of the bridge circuit, such that the third and fifth diodes, arranged in series, permit conduction in forward conduction mode, and the fourth and sixth diodes, arranged in series, permit conduction in reverse conduction mode.

* * * * *